Sept. 25, 1956 SHING-RIU LIU 2,764,073
PANORAMIC CAMERA
Filed Feb. 24, 1953 3 Sheets-Sheet 1

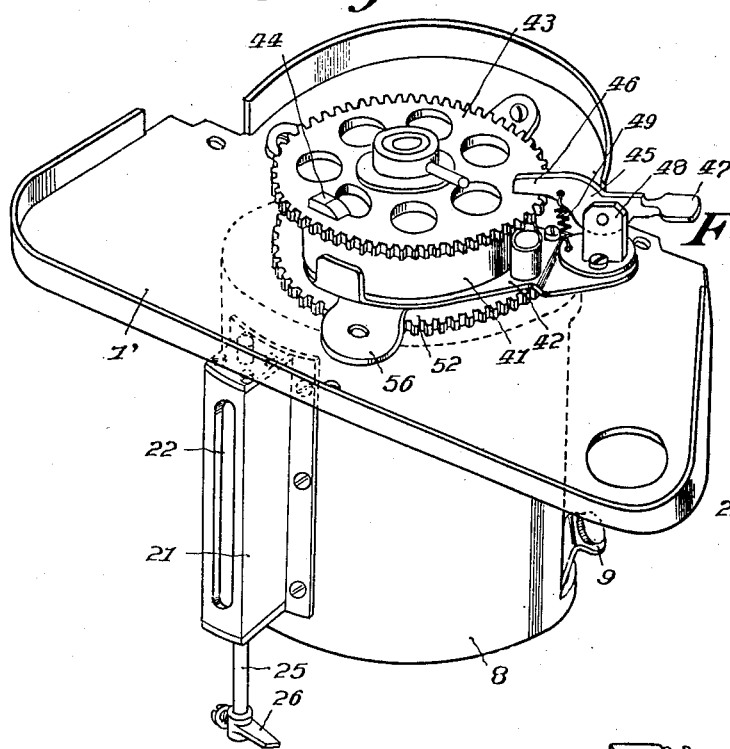
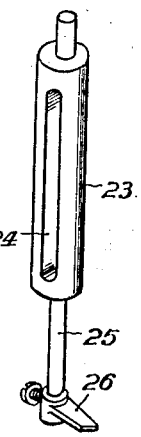
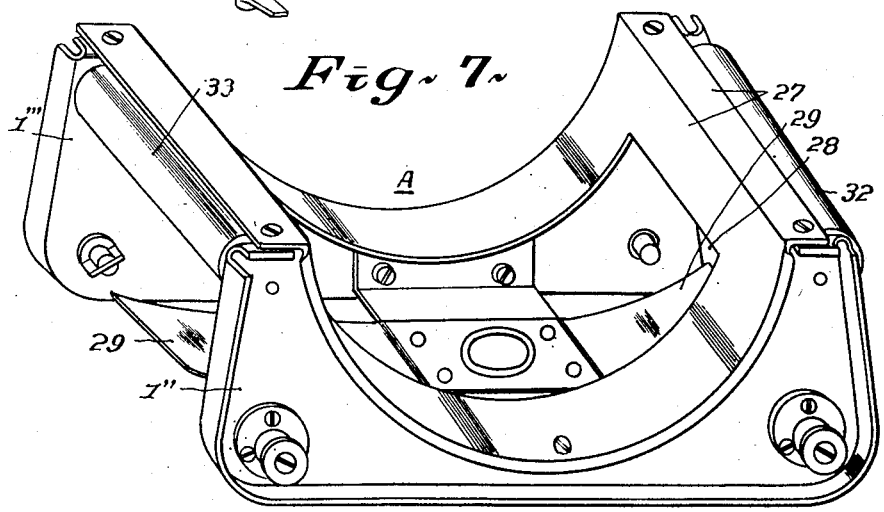

United States Patent Office

2,764,073
Patented Sept. 25, 1956

2,764,073

PANORAMIC CAMERA

Shing-riu Liu, Shinjuku-ku, Tokyo-to, Japan

Application February 24, 1953, Serial No. 338,470

1 Claim. (Cl. 95—16)

A panoramic camera having a wide exposure angle, which comprises a lens supported in the center of a rotatable cylinder so that its nodal point coincides with the rotation axis of said cylinder, means for supporting a film to be exposed in an arcuate path at the concentric position with the focus point of the said lens, a shutter box secured light-tightly with said cylinder for directing the light transmitted by the said lens to the said film, means adapted to rotate the said cylinder to project the light over a selected arc of the said film, adjustable limit means for automatically determining the angle of rotation of the said cylinder and the said shutter box and means for setting the said limit means at any predetermined position to limit the movement of the said cylinder and the said shutter box to any predetermined angle within the said maximum angle, has been already disclosed in U. S. application Serial No. 252,295. The camera therein disclosed has the advantage that the angle of light exposure may be adjusted at will in accordance with the predetermined angle position of the rotatable cylinder and the shutter box. It, however, is relatively complex in construction and high in cost because of its complex construction and somewhat delicate in operation because of the necessity for various means to be operated externally for achieving film exposing operation and return motion of the rotatable cylinder.

On the other hand, however, amateurs generally desire a panoramic camera having a wide exposure angle, which is simple in operation and low in cost rather than the high-grade camera as described above.

The object of this invention is to improve the said panoramic camera of high-grade to provide a camera suitable for use in general panoramic photography without requiring adjustment of the exposure angle.

The object of this invention has been accomplished by omitting the means for adjusting the stopping positions of the rotatable cylinder and the shutter box and the means for moving the shutter box to any predetermined position.

The object and the main construction of this invention will be clearly understood by reference to the following detailed description in connection with the accompanying drawings, where a preferred example of this invention is illustrated.

Fig. 5 is a perspective view of the rotatable cylinder of the camera illustrated in Fig. 1.

Fig. 6 is a perspective view of the shutter rod to be supported frictionally in the shutter box fixed on the rotatable cylinder in Fig. 5.

Fig. 7 is a perspective view of the film frame of the camera illustrated in Fig. 1.

Figure 1:
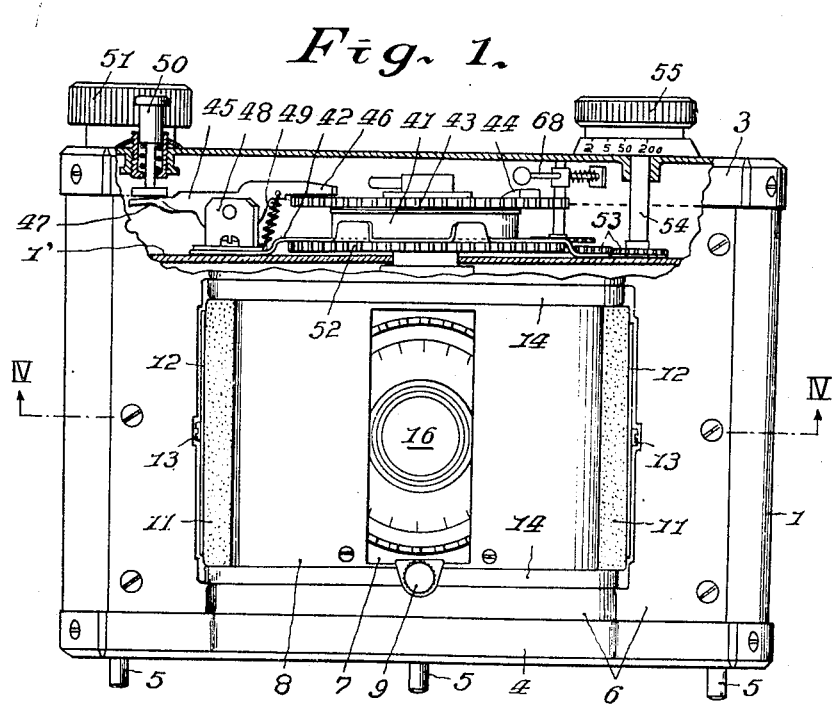
Fig. 1 is a front view of an example of this invention.

The casing of the camera is made up of a case frame 1 provided with a film viewing hole 2 covered by a red glass 2', an upper cover-case 3, a bottom cover-case 4 provided with three foot pins 5 arranged in a triangle and an arcuate cover 6 provided with a window 6' and fitted with the case frame 1. A rotatable cylinder 8 is supported rotatably by a supporting wall 1' to be fitted in the case frame 1 and an end plate 37 at its shaft 20, the parts 1' and 37 being connected rigidly by an arcuate frame plate 30 having a window 31 for admitting the light to the film.

A lens carrier 15 having a lens 16 disposed in its interior is supported in cylinder 8 by a supporting arm 19 so that the nodal point of the lens coincides with the rotation axis of the cylinder, this cylinder having a light-admitting aperture 7 for admitting light to the lens. A ring 17 is graduated on its upper surface to correspond to the focal distance. An outer ring 18 is combined with the lens carrier 15 so that when it is rotated with a finger inserted through the aperture 7 it will adjust the focal distance of the lens, the adjustment being seen by the graduations on the ring 17. As shown in Figs. 5 and 6 particularly, a shutter box 21 having a slit 22 is attached light-tightly to the rotatable cylinder 8 to direct the light transmitted by the lens 13 outwards and in the box is inserted a shutter rod 23 provided with a slit 24, the rod being supported frictionally in the box with its shaft 25 having a lug piece 26.

Figure 2:
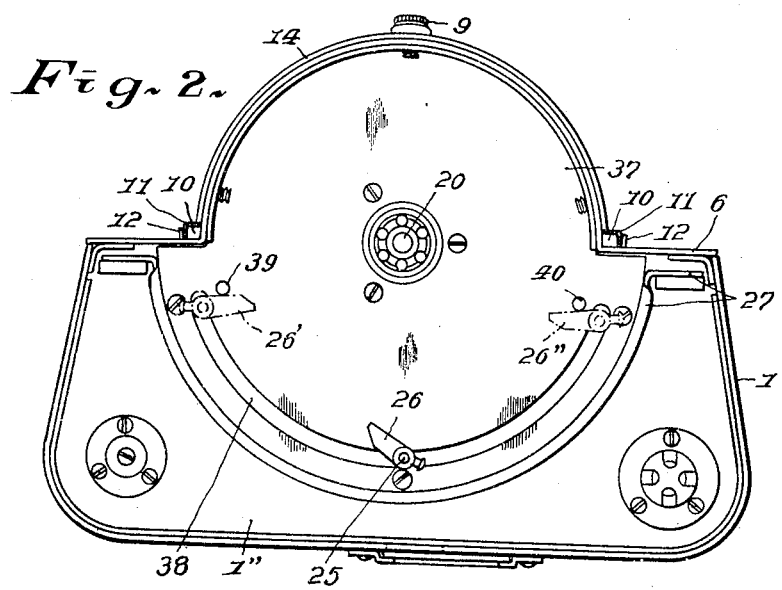
Fig. 2 is a bottom view of the camera illustrated in Fig. 1, the bottom and upper cover-cases being taken off.

The shaft 25 of the rod 23 is led loosely out of an arcuate opening 38 in the end plate 37 as shown in Fig. 2. In the case frame 1 is inserted a film frame A as shown in Fig. 7, which consists of a rear wall 1", a front wall 1''', an arcuate plate 27 provided with a light exposing window 28 and a film pressing elastic plate 29. The plate 27 is adapted to support a film 34 to be exposed in an arcuate path concentric with the focus of the lens 16, the film being supported upon a winding spool 35 and an unwinding spool 36 and guide rollers 32 and 33.

Figure 3:
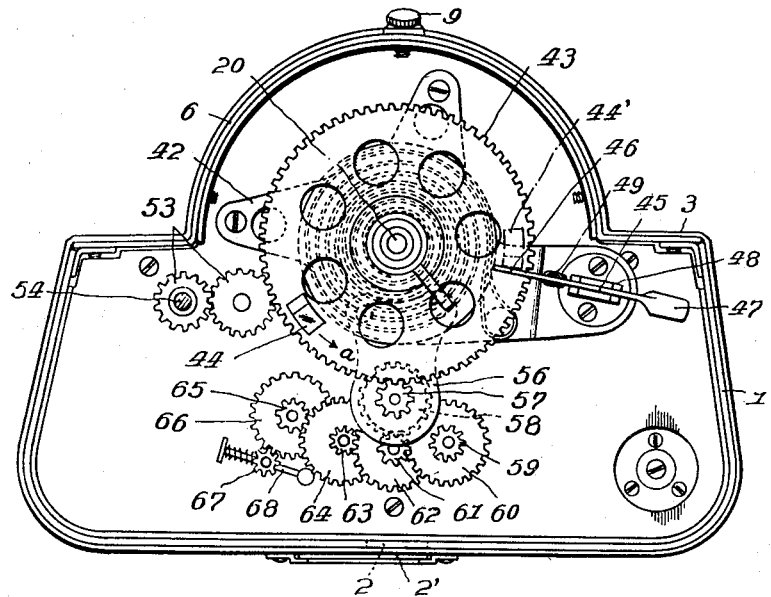
Fig. 3 is a plan view of the camera illustrated in Fig. 1, the upper cover-case being taken off.
Figure 4:
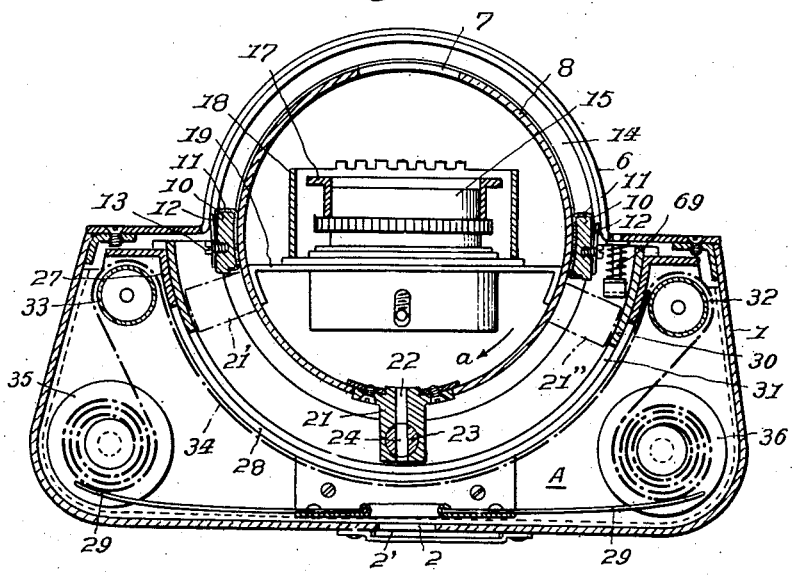
Fig. 4 is a sectional view sectioned through the line IV—IV of Fig. 1.

The film spools and rollers are supported in the film frame A at right and left side positions. A knob 9 fixed on the rotatable cylinder 8 is adapted to be moved by the user's finger to rotate the cylinder over an angle of about 180 degrees in the direction $a$ as shown in Figs. 3 and 4.

A spiral spring 41 is secured at its outer end on a supporting plate 42 and at its inner end on the shaft 20 of the rotatable cylinder 8 so that the spring may be wound by rotation of the cylinder in the direction $a$, the plate 42 being secured to the supporting wall 1' to be fitted in the case frame 1. Forwardly of the spiral spring 41, a toothed wheel 43 provided with a shutter projection 44 on the surface thereof is secured to the shaft 20 of the rotatable cylinder 8.

A lever 45 is pivotably supported by a supporter 48 on the supporting plate 42, one end 46 thereof being attracted downwards by the force of a spring 49 so that the shutter projection 44 may be caught by the end 46 when the rotatable cylinder 8 is rotated in the direction $a$ over an angle of about 180 degrees by means of the knob 9. A push button 50 is fixed on the cover-case 3 to push the end 47 of the lever 45.

A toothed wheel 52 fitted loosely on the shaft 20 of the rotatable cylinder 8 is arranged between the supporting plate 42 and supporting wall 1'' so that it may be rotated by the external knob 55 through its shaft 54 and a gearing 53. The knob 55 may be constructed so that it may be secured rigidly with the shaft 54 only when it is pulled up somewhat.

A flat arm 56 projecting from the wheel 52 supports loosely the shaft of a pinion 57 meshing with the toothed wheel 52, a toothed wheel 58 being secured on the shaft.

Several pinions 59, 61, 63, 65 are arranged concentric with the center of the shaft 20 so that each of them may mesh with the toothed wheel 58 in accordance with the position of the flat arm 56, this position being determined by corresponding rotation of the toothed wheel 52. A toothed wheel 60 secured with the shaft of the pinion 59 meshes with the pinion 61, a toothed wheel 62 secured with the shaft of the pinion 61 meshes with the pinion 63, a toothed wheel 64 secured with the shaft of the pinion 63 meshes with the pinion 65 and a toothed wheel 66 secured with the shaft of the pinion 65 meshes with the pinion 67, on the last pinion there being provided with a centrifugal governor 68.

As a whole, therefore, the toothed wheel 43 is connected with the centrifugal governor 68 through a gearing, so that the free rotation speed of the toothed wheel 43 will be easily adjusted by changing the meshing position between the toothed wheel 58 and the pinion 59, 61, 63 or 65 by adjusting the knob 55.

Operation of the camera illustrated and described above will be understood from the following description.

When the rotatable cylinder 8 is rotated by pushing the knob 9 in the direction $a$ until the shutter box 21 comes to the position shown by the broken line 21' in Fig. 4, the shutter projection 44 takes the position shown by the broken line 44' in Fig. 3 and is caught by the end 46 of the lever 45, so that the cylinder 8 stops at its position.

During said rotation the spiral spring 41 is wound, resulting in an accumulation of its spring force.

On the other hand, at the end position of said rotation, the lug piece 26 strikes the pin 39 projecting from the end plate 37 and turns about 90 degrees, so that the shutter rod 23 rotates and the slit 24 thereof comes into alignment with the slit 22 of the shutter box 21, resulting in a light exposing condition. At this position, however, light will not be directed on the film because of existence of the frame 30. Next, if the shutter button 50 is pushed, resulting in a pushing of the end 47 of the lever 45, the end 46 of the lever 45 ascends against the tension of the spring 49 and the shutter projection 44 is released, so that the rotatable cylinder 8 rotates by the unwinding force of the spiral spring 41, said force having been accumulated during the rotation of the cylinder in the direction $a$ as described above.

This reverse rotation of the cylinder will be stopped without any shock by the buffer button 69 provided with a buffer spring. During the reverse rotation the shutter box 21 moves while letting the light coming from the lens 16 project on the film stretched in the arcuate path and stops at the end position shown by the broken line 21" in Fig. 4. At this end position the lug piece 26 strikes a pin 40 projecting from the end plate 37 and turns reversely, so that the shutter rod 23 will be turned reversely about an angle of 90 degrees relative to the shutter box 21, resulting in closing the slit 22 of the latter.

In this manner, a wide portion of the film will be exposed and a single exposure will be made.

After the exposure the rotatable cylinder 8 is rotated again in the direction $a$ by pushing the knob 9 with a finger until the shutter projection 44 is caught by the end 46 of the shutter lever 45, resulting in winding of the spiral spring 41 and in preparation for the next exposure.

During the rotation of the rotatable cylinder in the direction $a$, any double exposure of light on the film will be effectively prevented because of the closed closing condition of the shutter box 21.

According to the present invention, it is possible to set up the camera at the starting position by simple rotation with a finger and without any apprehension of double exposure of light on the photographed film and to photograph automatically over a wide angle merely by pushing a shutter button.

As it is evident that many changes and modifications can be made in the above described details of this invention without departing from the nature and spirit of this invention, it is to be understood that this invention is not to be limited to these details but only by the appended claim.

Having thus described my invention I claim:

In a panoramic camera having a casing, a plate supported in said casing, said plate having an arcuate slot formed therein, a cylinder rotatably mounted in said casing at the axis of said slot, said cylinder having an opening for admitting light, a shutter unit carried by said cylinder opposite said opening, said shutter unit comprising a body portion having an axial bore communicating with the interior of said cylinder in alignment with said opening and passing entirely through said body portion, a rotatable shutter element mounted in said body portion upon an axis perpendicular to the axis of said bore, said shutter element having a light transmitting opening movable upon rotation of said shutter element into a position coinciding with the bore in said shutter unit to open said bore to the passage of light therethrough and movable to a position out of alignment with said bore to close said bore in selected positions of said cylinder, said shutter element including a shaft extending through said arcuate slot and a lug at the end of said shaft and said plate being provided with stop means for engagement with said lug adjacent the ends of said arcuate slot for moving said element to place said shutter element opening into and out of coincidence with said bore, said slot limiting the rotational movement of said cylinder and thereby limiting the path of travel of said shutter unit.

References Cited in the file of this patent

UNITED STATES PATENTS

| | | |
|---|---|---|
| 526,471 | Waters | Sept. 25, 1894 |
| 624,553 | Shaw | May 9, 1899 |
| 671,154 | Angsten | Apr. 2, 1901 |
| 694,929 | Houston | Mar. 4, 1902 |
| 766,874 | Cheesman | Aug. 9, 1904 |
| 1,503,437 | James | July 29, 1924 |
| 2,129,959 | Pollock | Sept. 13, 1938 |
| 2,148,011 | Burke | Feb. 21, 1939 |